Jan. 7, 1941.    C. E. KRAUS    2,228,168
METHOD OF AND MACHINE FOR MILLING
Filed Feb. 27, 1939    4 Sheets—Sheet 1

INVENTOR
Charles E. Kraus
By Parker, Carlton, Pitzner & Hubbard
ATTORNEYS

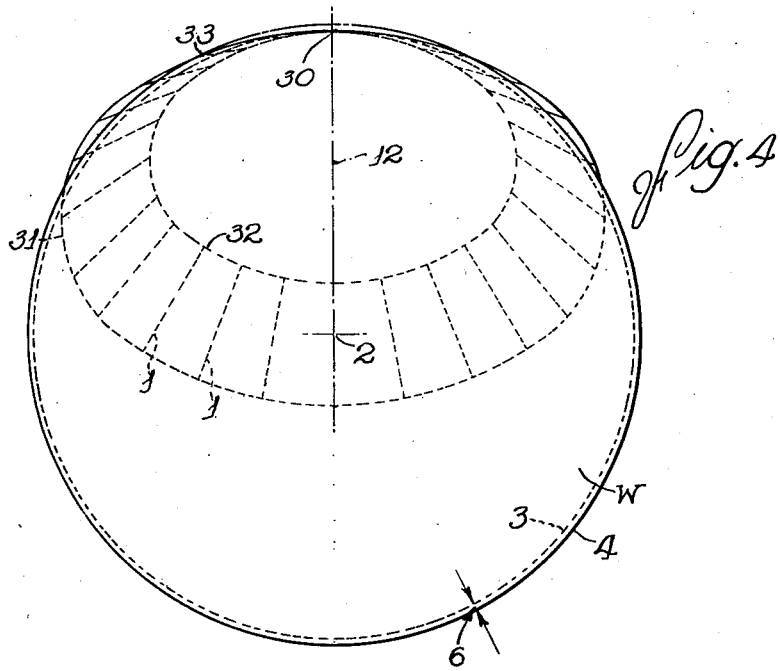
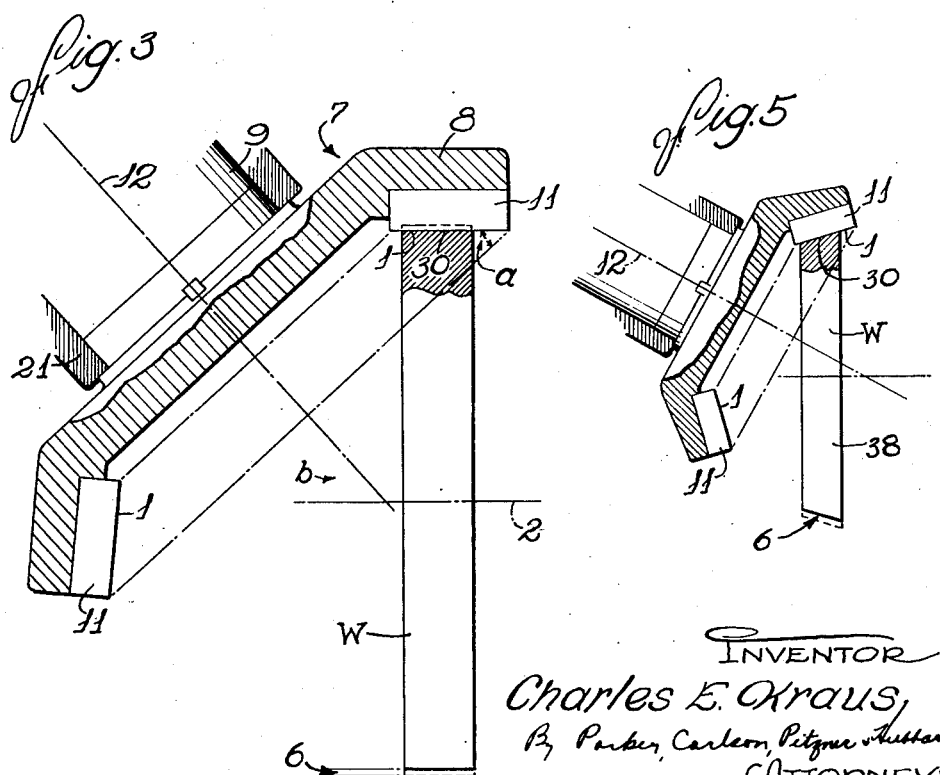

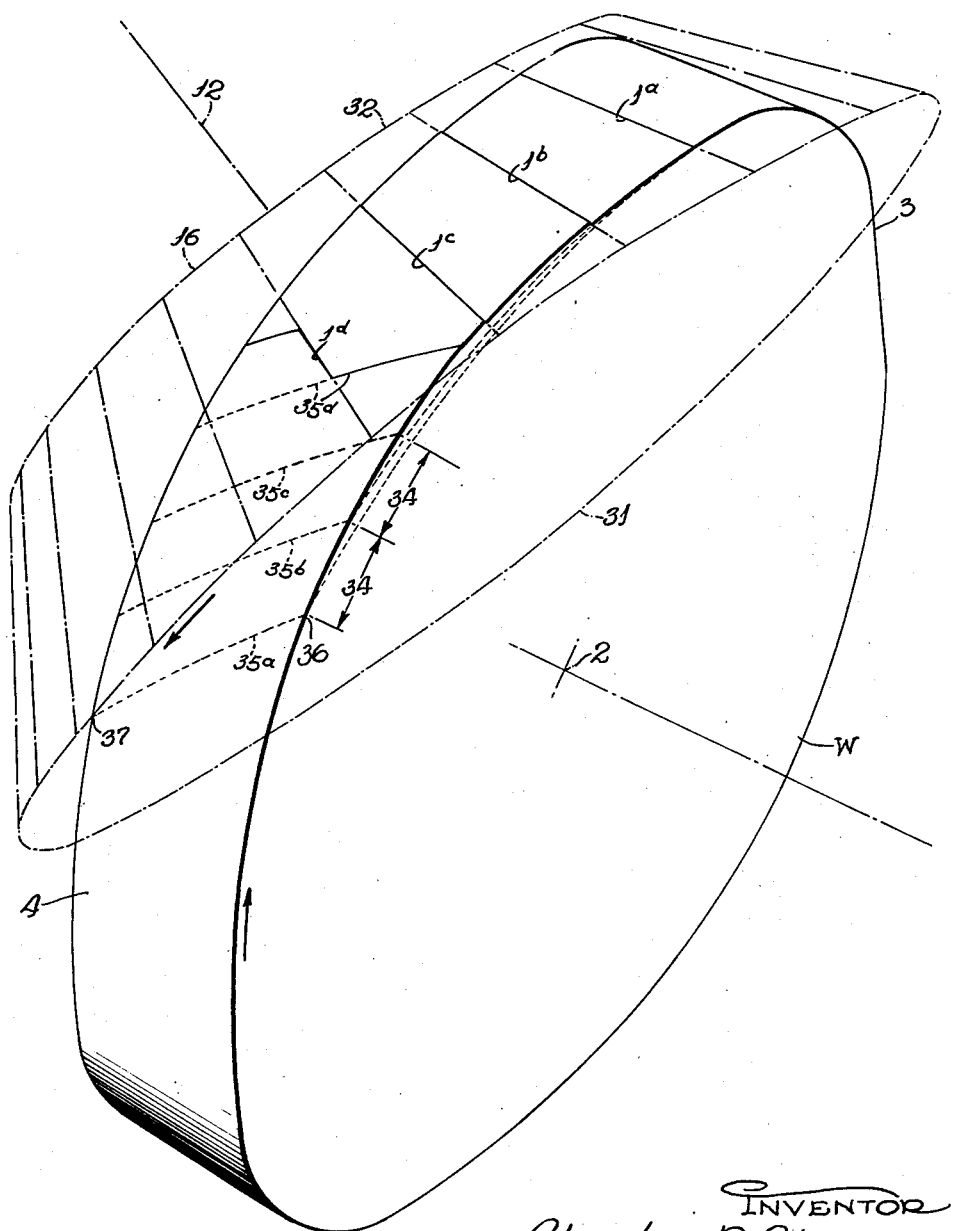

Jan. 7, 1941.  C. E. KRAUS  2,228,168
METHOD OF AND MACHINE FOR MILLING
Filed Feb. 27, 1939  4 Sheets-Sheet 4
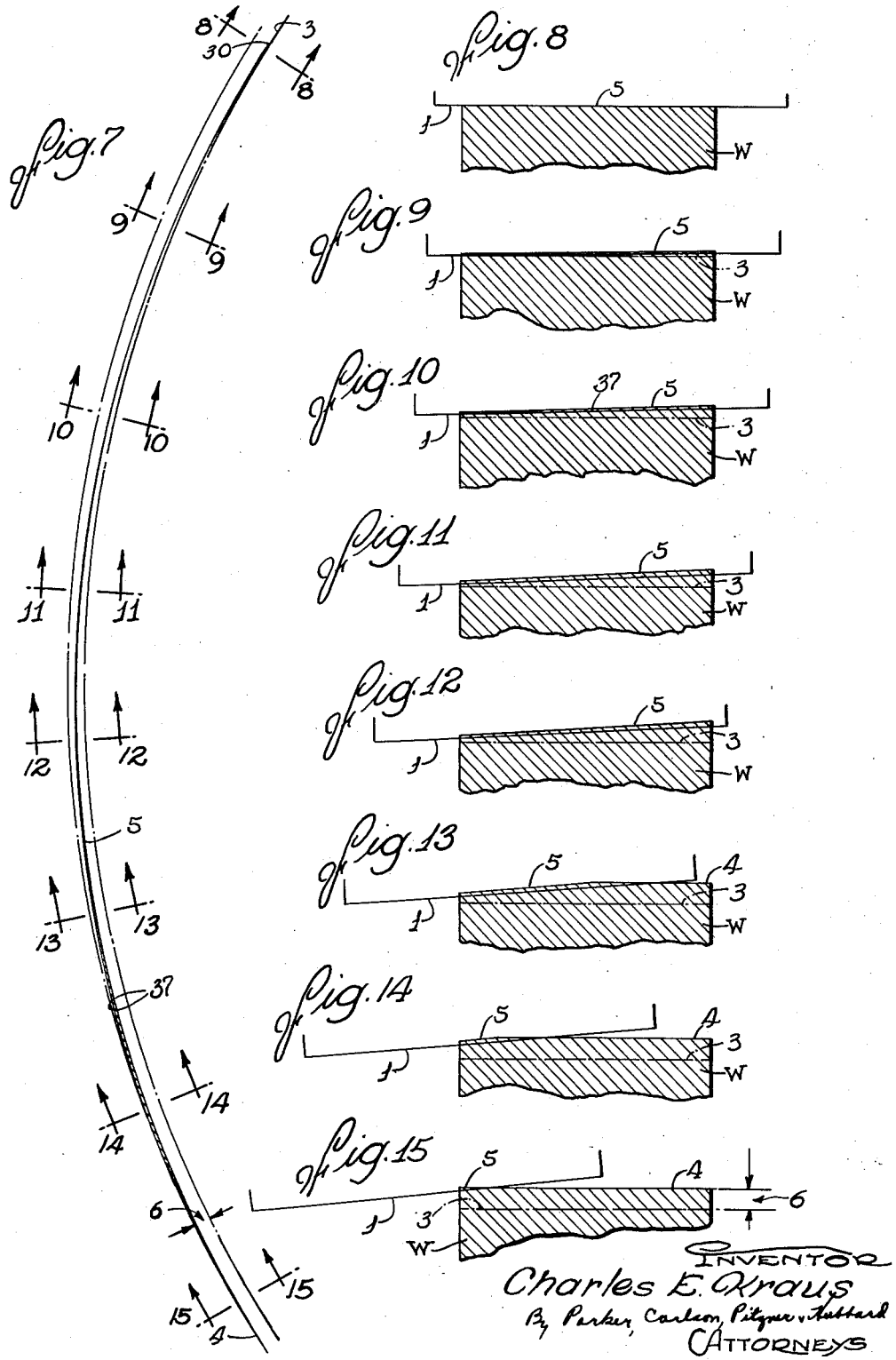

Patented Jan. 7, 1941

2,228,168

UNITED STATES PATENT OFFICE 2,228,168

METHOD OF AND MACHINE FOR MILLING

Charles E. Kraus, Rockford, Ill., assignor to The Ingersoll Milling Machine Company, Rockford, Ill., a corporation of Illinois Application February 27, 1939, Serial No. 258,659

11 Claims. (Cl. 90—20)

This invention relates to the milling of work pieces with a cutter having a frusto-conical cutting face, and the primary object is to provide a new and improved method and machine by which such a cutter may be utilized to remove a layer of material from a convexly curved external work surface.

Another object is to provide a method and machine of the above character which is adapted to the milling of work surfaces having conical as well as cylindrical contour and having radii of curvature that may be substantially greater than the radius of the cutter face.

The invention also resides in the novel arrangement of cutting edges and a work piece which enables material to be milled at a high rate of feed and the chips which are formed to be disposed of efficiently.

Other objects and advantages of the invention will become apparent from the following detailed description taken in connection with the accompanying drawings, in which Figure 1 is a front elevational view of a typical machine in which the present invention may be practiced.

Fig. 3 is a diagrammatical sectional view of the cutter showing its relation to a cylindrical work piece.

Fig. 4 shows the relation of the work piece and the cutting face as viewed along the work axis.

Fig. 5 is a view similar to Fig. 3 showing the relation of the work and cutter during the milling of a conical surface.

Fig. 6 is an enlarged perspective view illustrating the different relative positions of the work and cutter blades during the progress of a cut.

Fig. 7 is a longitudinal sectional view of one of the chips removed by the cutter.

Figure 1:
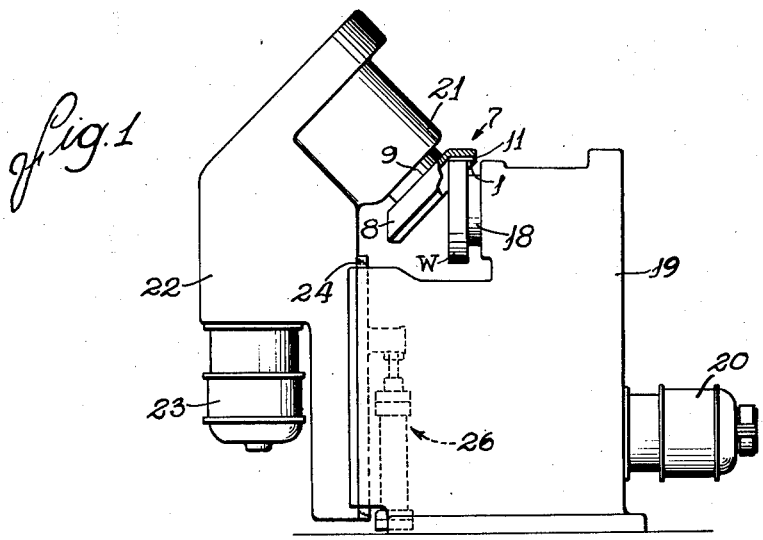

Figs. 8 to 15 inclusive are transverse sectional views of the chips and cutting edges taken respectively along the lines 8—8 to 15—15 of Fig. 7.

While the invention is susceptible of various modifications and is capable of being practiced in various machines and on widely varying types of work pieces, I have shown in the drawings and will described herein the preferred embodiments of the invention and typical ways of practicing the same. I do not intend to limit the invention by such exemplary disclosure but aim to cover all modifications and alternative methods, constructions, and uses falling within the spirit and scope of the invention as expressed in the appended claims.

The invention is based on my discovery that a frusto-conical cutting face, when of the proper contour and of proper size and slope correlated with the size and shape of a work piece, may be utilized to mill metal from an external conical or cylindrical surface in slices which are extremely thin but very long. As applied to the milling of such surfaces, the invention comprises revolving an annular series of cutting edges 1 defining an internal cutting face of frusto-conical contour having a diameter and cone angle related to the work curvature, positioning the work piece W with one side portion disposed interiorly of said cutting face and with an arcuate portion of the cutting face intersecting the metal layer to be removed, and finally relatively rotating the work piece and the revolving edges to feed one about the center of curvature 2 of the work surface. During such feeding movement, each cutting edge enters the work on the finished surface 3 thereof and while following around a substantial arc of the work surface, progresses laterally across the work and rises through the layer 6 and the rough surface 4 so gradually as to result in the formation of a chip 5 which is extremely thin but of substantial length. As a result, a very smooth fine finish is obtainable at rates of feed many times greater than those heretofore employed in practice.

The cutting face is on a cutter 7 comprising a body 8 keyed on the end of a rotary spindle 9 and hollowed out to define an internal frusto-conical end face 10 from which angularly spaced blades 11 project inwardly toward the cutter axis 12. The blades are seated in slots 13 and held in the body by suitable fastening means such, for example, as wedges 14 locked in place by screws 15. The cutting edges 1 extend along the leading side of each blade and preferably are straight and disposed to act at rake and shear angles proper for efficient cutting of the work material to be milled.

The edges 1 have radial lengths substantially greater than the width of the work measured transversely of the direction of feed. They are spaced uniformly around the cutter and lie on and revolve in a conical frustum having a slope or cone angle $a$ the magnitude of which is determined by the various factors later to be considered.

During a milling operation, the work piece and cutter may be supported and moved in various types of machines. In the one shown in Fig. 1 for purposes of illustration, the work piece W is clamped in a suitable fixture (not shown) carried on the end of an arbor 18 supported in a rigid frame structure 19. In the present instance, relative feeding movement between the cutter and work is obtained by rotating the arbor 18 which is rotatably mounted and driven by an electric motor 20 operating through appropriate speed reduction gearing housed within the frame 19.

The cutter spindle is journaled in bearings 21 in a head 22 with its axis intersecting the work axis 2 at the proper angle $b$ determined by the slope of the finished work surface to be formed and the cone angle $a$ of the cutter employed. The head is connected through appropriate speed reduction gearing (not shown) to an electric motor 23 by which the spindle is driven at a speed properly correlated with that of the work as will appear later. To facilitate loading and unloading of the work fixture and the milling of complete cylinders, provision is made for shifting the cutter 7 into and out of engagement with a work piece on the arbor 18. Herein, this is accomplished by mounting the head 22 to slide vertically along ways 24 on the frame 19. The head may be raised and lowered by suitable means such as a fluid pressure actuator 26 arranged to shift the head between fixed limit stops at controlled rates.

To explain the cutting action more in detail, let it be assumed that a layer 6 of metal is to be removed from the periphery of a work piece to form a truly cylindrical finished surface 3 which may, as shown, be of a diameter substantially greater than that of the cutter. For this purpose, the work piece and the cutter are positioned relative to each other as shown in Figs. 1, 3, 4, and 6 when the cutter head is in its lowered or operating position. Herein, the cutter has a cone angle of about 42 degrees so that in order to produce a cylindrical finished surface, the angle $b$ must be equal to one-half the apex angle of the conical cutting face, that is, the complement of the cone angle $a$ as shown in Fig. 3. One side portion of the work piece projects through the base of the frusto-conical cutting face and is disposed tangent to the finished surface 3 and with a substantial part of each cutting edge 1, when at the line 30 of tangency as shown in Figs. 3 and 4, overhanging the side of the work piece remote from the cutter axis.

Figure 2:
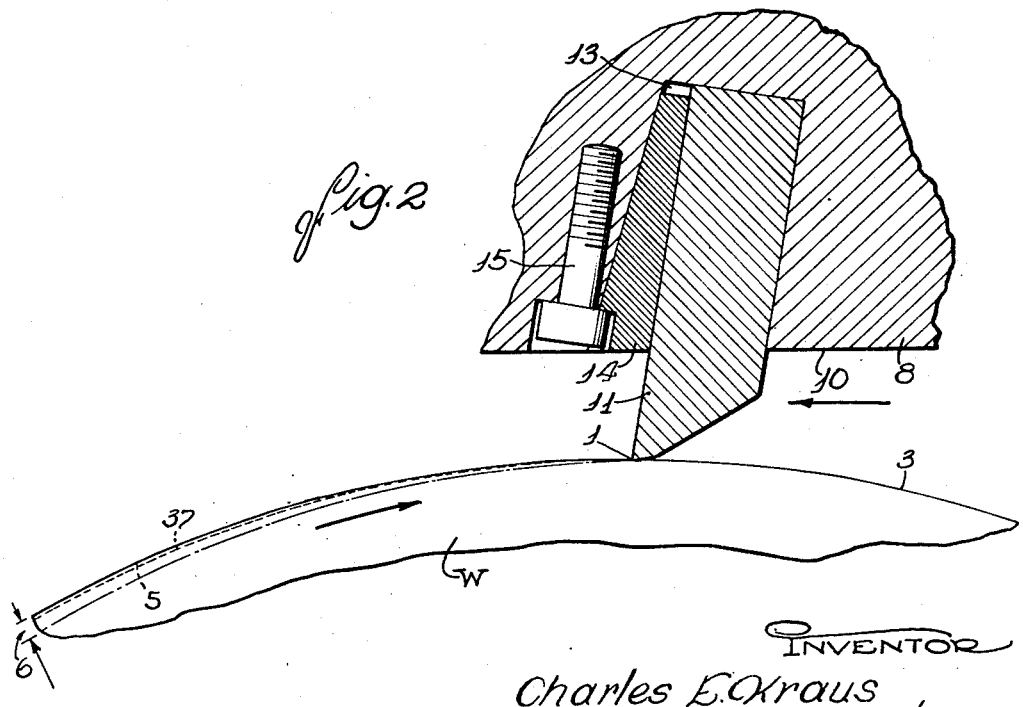
Fig. 2 is a fragmentary sectional view through a part of the work and one of the cutter blades and its mounting.

When the cutter and work are thus positioned and rotated in the directions indicated by the arrows in Figs. 2 and 6, it will be apparent that the cutting edges 1 and the layer 6 of work material to be moved move along intersecting paths and that each edge, in cutting through the layer along a line 37, first moves generally longitudinally of the work path as it enters along the line 30 of tangency and then progresses arcuately across the latter to a line of emergence on the rough surface.

From Fig. 4, it will be observed that the projections of the inner and outer peripheries of the cutting face on a plane of revolution of the work piece are two ellipses 31 and 32 tangent to each other at 30. The outer ellipse intersects the work along an arc of substantial length which extends between points 30 and 33 and has a radius curvature which is greater than but closely approaches that of the work surface 3. As a result, the cutter 7, even though it is of smaller diameter than the work surface, is capable of removing metal in slices 5 extending between the finished and rough surfaces. Owing to the small difference in curvature between the work surface and the arc of the ellipses along which the cutting edges are effective, the slices 5 will be extremely thin at their thickest point and yet will be of such substantial length as to be of large volume. The length is, of course, equal to the arc 30—33 of intersection of the cutting face with the work layer 6 plus the distance 34 through which the work is fed per tooth of the cutter times the number of teeth in contact with the work.

The progress of the cuts and the manner of chip formation is illustrated in Figs. 6 to 15. Four cutting edges $1^a$, $1^b$, $1^c$, and $1^d$ are in engagement with the work and these will emerge from the rough surface 4 along lines $35^a$, $35^b$, $35^c$, and $35^d$ respectively, the spacing of which lines equals the distance through which the work is fed per cutter tooth. The edge $1^a$ is just entering the work so that its chip 5 is very thin (Fig. 8). As the edge advances, the zone of its engagement with the work shifts outwardly along the edge due to inclination of the work and the edge. For the same reason, the chip, which increases in thickness progressively (Figs. 9 to 12), becomes thicker on the far side of the work, reaching its maximum thickness (Fig. 12) as the edge begins to emerge from the rough surface at the point 36. Then, the chip becomes narrower and also thinner at the far edge, tapering to a feather edge at the point 37 of final engagement of the edge from the work.

Because the edges 1 enter the work and progress therethrough initially at such very small angles, a fine smooth finish is produced which is not affected appreciably by the rate of feed. The maximum angles at which the edges travel relative to the direction of feed is so small that the maximum chip thickness is only a very small fraction of the feed per tooth. For this reason, extremely high rates of feed may be employed without overburdening the cutting material. And yet, due to the substantial lengths of the chips, metal can be removed from the work piece at a very rapid rate.

From the foregoing consideration, it will be apparent that the length and thickness of the chips or metal slices 5 which are removed during a milling operation are influenced by numerous factors including the magnitude of the cone angle $a$, the size of the cutter, the rate of feed, the thickness of the layer 6 of stock to be removed, and the distance which the cutting edges overhang the finished work surface at the point of blade entry. For example, the larger the cone angle $a$, the greater will be the length of the chip 5 and the finer will be the finish produced. This, however, necessitates a corresponding increase in the diameter of the cutter employed. Therefore, in adapting the invention to the milling of a work piece of given curvature, the essential thing is to correlate the various factors mentioned above in a manner such that the ellipse 31 of projection of the cutting face on the plane of rotation of the work possesses a curvature adjacent its minor axis greater than the curvature of the finished work surface. So long as this essential relationship exists, the factors influencing it may be varied relative to each other in order to obtain other desired conditions. For example, if it is desirable in a given instance to employ a cutter of a given size, the other factors may be varied to produce chips of proper length and thickness. Or, where the cutter is to be used primarily for finishing, it would be preferable to employ a cutter having a diameter closely approaching that of the finished work surface.

The invention also provides for efficient disposal of the chips removed by each cutting edge. This is for the reason that the cutting edges 1 move laterally across the work, thereby permitting the chips to fall from the cutter clear of the work.

The work piece, whether a complete cylinder as shown or any arcuate portion of a cylinder, will be milled completely by turning through an arc equal to the circumferential length of the work surface to be formed after the cutter has been lowered to its final operating position (Figs. 1 and 3). To mill a cylindrical work piece of the character shown, the piece would be loaded into its fixture while the cutter head 22 is held in raised position by the actuator 26. Then, while the cutter and work are rotating, the head 22 would be lowered slowly to feed the cutter to depth after which rotation of the work piece is continued for a full revolution. Work pieces having an arcuate finished surface of less than 180 degrees may be loaded without the necessity of shifting the cutter laterally. In such a case, the actuator 26 may be omitted and the cutter head mounted stationarily.

The invention is also applicable to the milling of frusto-conical surfaces or arcuate parts thereof. To accomplish this, it is merely necessary to change the cone angle $a$ of the cutter or to change the angle $b$ of intersection between the work and cutter axes so that the cutting edges 1 will overhang the base of the cone and their orbits of travel will be tangent to the surface to be formed on the work piece. Such an arrangement for milling a frusto-conical surface 38 on the work piece is shown in Fig. 5 wherein the parts are numbered to correspond to those previously described.

I claim as my invention:

1. A machine tool for removing a layer of material from a work piece to form a finished surface lying on a cylinder or cone, said machine comprising, in combination, a rotary hollow ended cutter head, a series of annularly spaced straight cutting edges carried within the hollow end of said head and defining an internal cutting face lying on a conical frustum the axis of which is coincident with that of said head, means for supporting said work piece with a peripheral portion thereof projecting through the base of said frustum and with said cutting face disposed tangent to said finished surface and overhanging the latter a substantial distance on the far side of the work, and power actuated mechanism for relatively rotating said supporting means and said rotating head at a speed correlated with that of said head and about an axis disposed at an angle relative to the axis of said frustum.

2. A machine tool for removing a layer of material from a work piece to form a finished surface lying on a cylinder or cone, said machine comprising, in combination, a power rotated cutter head, a series of annularly spaced cutting edges carried by said head and defining an internal cutting face lying on a conical frustum coincident with the axis of said head and correlated in diameter and slope with the curvature of said surface, means for supporting said work piece with a peripheral portion thereof projecting through the base of said frustum and with said cutting face disposed tangent to said finished surface, and power actuated mechanism for relatively rotating said supporting means and said rotating head about an axis inclined relative to the rotational axis of the head.

3. A machine tool for removing a layer of material from a work piece to form a finished surface lying on a cylinder or cone, said machine comprising, in combination, a power rotated cutter head, a series of annularly spaced cutting edges carried by said head and defining an internal cutting face lying on a conical frustum, means for supporting said work piece with a peripheral portion thereof projecting through the base of said frustum and with said cutting face disposed tangent to said finished surface and intersecting said layer, and power actuated mechanism for relatively rotating said supporting means and said rotating head at a speed correlated with that of the head and about an axis inclined relative to the rotational axis of the head.

4. A machine tool for removing a layer of material from a work piece to form an arcuate surface thereon comprising, in combination, a power rotated cutter head carrying a series of annularly spaced cutting edges defining an internal frusto-conical cutting face, means for supporting said work piece with said cutting face disposed tangent to said finished surface and with the axis of said cutting face disposed at an angle to the axis extending through the center of curvature of said finished surface paralleling the latter, and power actuated mechanism for relatively feeding said supporting means and said rotating head to carry said layer through a zone of engagement with said cutting face.

5. A machine tool for removing a layer of material from a work piece to form an arcuate finished surface, said machine comprising, in combination, a support for said work piece, a tool support, means supporting one of said supports for rotation about the center of curvature of the work piece when the latter is mounted on said work support, a power rotated cutter on said tool support carrying an annular series of cutting edges lying on a conical frustum and defining an internal cutting face disposed tangent to said finished surface, the projection of said face on the plane of rotation of said rotary support being an ellipse having a curvature adjacent its minor axis greater than said finished work surface, and power actuated mechanism for rotating said rotatable support to relatively feed said layer through a zone of engagement with said face.

6. A machine tool for removing a layer of material from a work piece to form an arcuate finished surface, said machine comprising, in combination, a support for said work piece, a tool support, means supporting said supports for rotation of one of the supports about the center of curvature of the work piece when mounted on said work support and also for relative movement of said supports generally longitudinally of the plane of rotation of the rotary support whereby to facilitate loading and unloading of the work support, a power rotated cutter on said tool support carrying an annular series of cutting edges defining an internal frusto-conical cutting face disposed tangent to said finished surface, and power actuated mechanism for rotating said rotatable support to relatively feed said layer through a zone of engagement with said face.

7. The method of removing a layer of material from a work piece to form an arcuate finished surface thereon which comprises revolving an annular series of cutting edges defining an internal cutting face of frusto-conical contour having a diameter and cone angle related to the curvature of said surface, positioning the work piece interiorly of said cutting face with an arcuate portion of the cutting face intersecting said layer and with the face disposed tangent to said surface, and relatively rotating the work piece and the revolving edges to feed one about an axis including the center of curvature of said surface and disposed relative to the axis of revolution of said frustum at an angle equal to the cone of the frustum.

8. The method of removing a layer of material from a work piece to form an arcuate finished surface thereon which comprises revolving an annular series of cutting edges of lengths greater than the width of said surface and lying on a conical frustum the axis of which is coincident to the axis of revolution of said edges, supporting said work piece and said edges for relative rotary movement about the center of curvature of said surface with said frustum disposed tangent to said surface, and relatively rotating the work piece and said edges at a feed rate correlated with the speed of revolution of the edges about an axis extending through said center of curvature and angularly disposed relative to the axis of said frustum.

9. The method of removing a layer of material from a work piece to form an arcuate finished surface thereon which comprises revolving an annular series of cutting edges defining an internal cutting face of frusto-conical contour the projection of which on a predetermined plane is an ellipse having a curvature adjacent its minor axis greater than that of said surface, positioning the work piece interiorly of said cutting face with the face disposed tangent to said surface, and relatively rotating the work piece and the revolving edges in said plane about the center of curvature of said surface.

10. The method of removing a layer of material from a work piece to form an arcuate finished surface thereon which comprises rotating an internal frusto-conical cutting face, supporting said work piece and said cutting face with a portion of the work piece disposed within and intersecting said face, and relatively rotating the work piece and said face about axes inclined relative to each other to relatively feed said layer through the zone of intersection with said face.

11. A machine tool for removing a layer of material from a work piece to form a finished surface lying on a cylinder, said machine comprising, in combination, a power rotated cutter head, a series of annularly spaced cutting edges carried by said head and defining an internal cutting face lying on a conical frustum, means for supporting said work piece with a peripheral portion thereof projecting through the base of said frustum and with said cutting face disposed tangent to said finished surface, and power actuated mechanism for relatively feeding said supporting means and said rotating head about an axis inclined at an angle relative to the rotational axis of the head which angle is the complement of the cone angle of said frustum.

CHARLES E. KRAUS.